US012228219B2

(12) United States Patent
Gresset et al.

(10) Patent No.: US 12,228,219 B2
(45) Date of Patent: Feb. 18, 2025

(54) EXPANSION VALVE COMPRISING A MOVABLE SLIDE

(71) Applicant: SCHRADER, Pontarlier (FR)

(72) Inventors: Benoit Gresset, Pontarlier (FR); Loïc Joly, Pontarlier (FR); Sébastien Robert, Pontarlier (FR)

(73) Assignee: SCHRADER, Pontarlier (FR)

( * ) Notice: Subject to any disclaimer, the term of this patent is extended or adjusted under 35 U.S.C. 154(b) by 0 days.

(21) Appl. No.: 18/549,338

(22) PCT Filed: Feb. 24, 2022

(86) PCT No.: PCT/FR2022/050336
§ 371 (c)(1),
(2) Date: Sep. 6, 2023

(87) PCT Pub. No.: WO2022/189722
PCT Pub. Date: Sep. 15, 2022

(65) Prior Publication Data
US 2024/0309956 A1    Sep. 19, 2024

(30) Foreign Application Priority Data
Mar. 8, 2021  (FR) ...................................... 2102208

(51) Int. Cl.
*F16K 3/26*    (2006.01)
*F16K 1/12*    (2006.01)
(Continued)

(52) U.S. Cl.
CPC .............. *F16K 3/265* (2013.01); *F16K 1/123* (2013.01); *F16K 3/243* (2013.01); *F16K 3/314* (2013.01);
(Continued)

(58) Field of Classification Search
CPC .......... F16K 3/265; F16K 1/123; F16K 3/243; F16K 3/314; F16K 27/041; F16K 47/08; F25B 41/30
(Continued)

(56) References Cited

U.S. PATENT DOCUMENTS 4,452,424 A * 6/1984 Kawata ............... F16K 31/0648
335/262
4,523,436 A * 6/1985 Schedel .................. F25B 41/35
251/282
(Continued)

FOREIGN PATENT DOCUMENTS

EP  0147357 A2  7/1985
EP  2725268 A1  4/2014
(Continued)

OTHER PUBLICATIONS

Foreign Communication from a Related Counterpart Application, International Search Report and Written Opinion dated May 30, 2022, International Application No. PCT/FR2022/050336 filed on Feb. 24, 2022.

*Primary Examiner* — John Bastianelli
(74) *Attorney, Agent, or Firm* — Conley Rose P.C.

(57) ABSTRACT

The present invention relates to an expansion valve intended to be arranged in a fluid passage between an upstream conduit and a downstream conduit, the expansion valve comprising: —a tubular valve body which is provided, in an upstream axial end section, with at least one upstream orifice intended to be in communication with the upstream conduit and, in a downstream axial end section, with at least one downstream orifice intended to be in communication with the downstream conduit, the downstream orifice and the upstream orifice being connected by a main channel, —a shut-off device which is movable between a closed position and an open position with respect to the downstream orifice.

(Continued)

The shut-off device includes a slider which is mounted to slide axially on the downstream axial end section of the valve body.

13 Claims, 3 Drawing Sheets

(51) Int. Cl.
  *F16K 3/24* (2006.01)
  *F16K 3/314* (2006.01)
  *F16K 27/04* (2006.01)
  *F16K 47/08* (2006.01)
  *F25B 41/30* (2021.01)

(52) U.S. Cl.
  CPC .......... *F16K 27/041* (2013.01); *F16K 47/08* (2013.01); *F25B 41/30* (2021.01)

(58) Field of Classification Search
  USPC .......................................... 251/324
  See application file for complete search history.

(56) References Cited

U.S. PATENT DOCUMENTS

| 5,460,349 | A | 10/1995 | Campbell et al. | |
|---|---|---|---|---|
| 7,073,532 | B2 * | 7/2006 | Bowe | F16K 3/265 |
| | | | | 137/625.33 |
| 9,285,038 | B2 * | 3/2016 | Xu | F25B 41/35 |

FOREIGN PATENT DOCUMENTS

| EP | 3392534 A1 | 10/2018 |
|---|---|---|
| WO | 2004001260 A1 | 12/2003 |
| WO | 2022189722 A1 | 9/2022 |

* cited by examiner

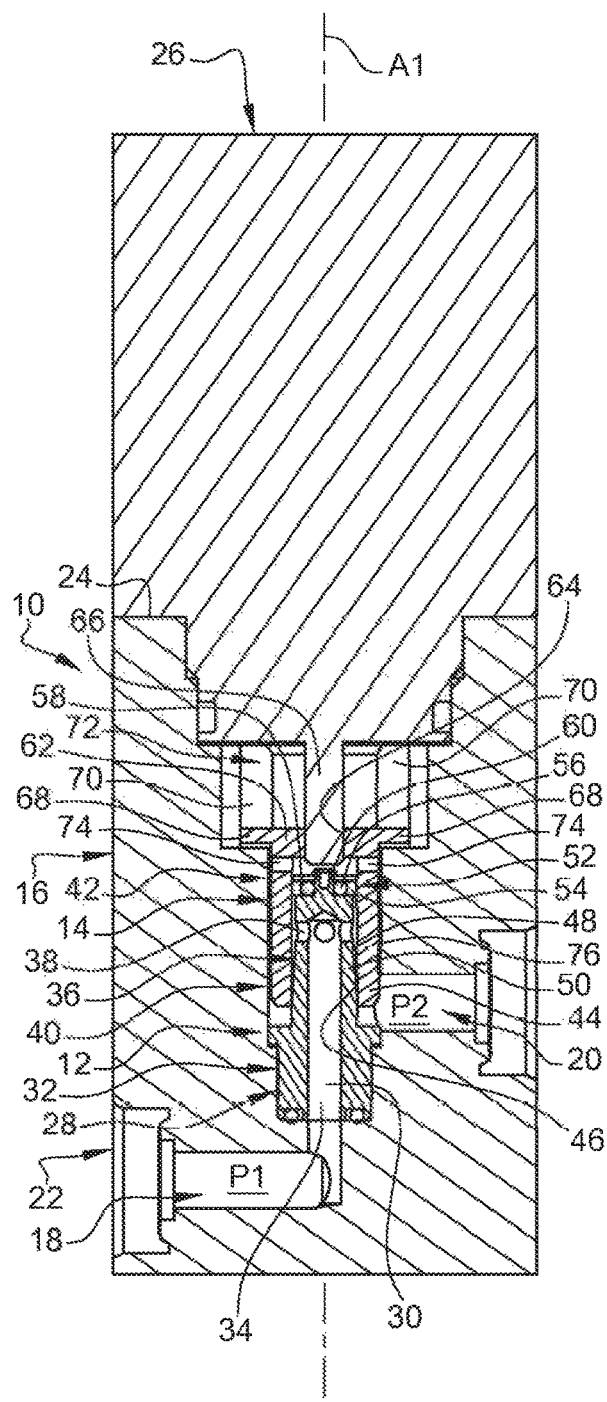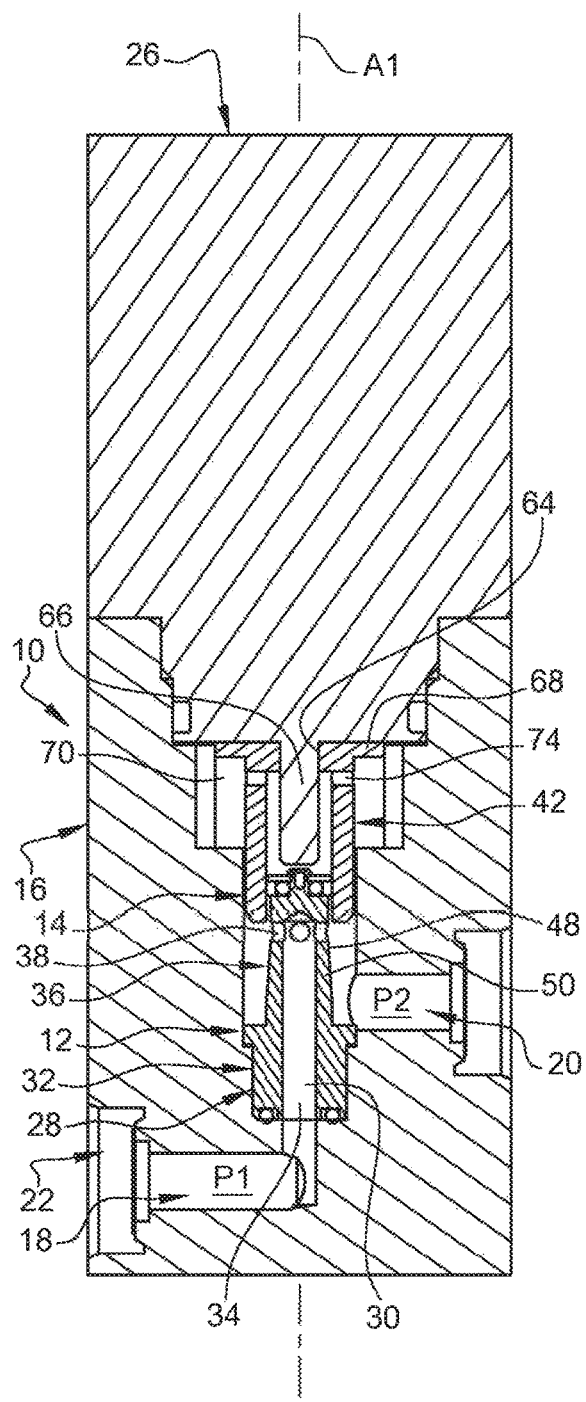

EXPANSION VALVE COMPRISING A MOVABLE SLIDE

CROSS-REFERENCE TO RELATED APPLICATIONS

The present application is a filing under 35 U.S.C. 371 as the National Stage of International Application No. PCT/FR2022/050336, filed Feb. 24, 2022, entitled "EXPANSION VALVE COMPRISING A MOVABLE SLIDE," which claims priority to French Application No. 2102208 filed with the Intellectual Property Office of France on Mar. 8, 2021, both of which are incorporated herein by reference in their entirety for all purposes.

TECHNICAL FIELD OF THE INVENTION

The present invention relates to an expansion valve.

More particularly, the invention relates to an expansion and isolation valve intended to control the passage of a fluid between an upstream conduit and a downstream conduit, in particular when the fluid is subjected to high pressures.

TECHNICAL BACKGROUND

Different types of expansion and isolation valves are known to control the passage of a fluid. This valve type is used in particular to expand a gas or fill a so-called "on-off" all or nothing function.

In the case of applications under high pressures, as soon as a movable surface is subjected to a differential pressure, the forces to be mobilized are considerable, which requires the use of an actuator with a high torque and which increases the risks of jamming.

Hence, there is a need for a simple and economical solution which allows controlling an expansion valve with a low-torque actuator.

Also known are valves as disclosed in the documents EP0147357A2, WO2004/001260A1, and U.S. Pat. No. 5,460,349A.

SUMMARY OF THE INVENTION

To solve the aforementioned problem, the invention provides an expansion valve intended to be arranged in a fluid passage between an upstream conduit and a downstream conduit, the expansion valve comprising:
  a tubular valve body which is provided, in an upstream axial end section, with at least one upstream orifice intended to be in communication with the upstream conduit and, in a downstream axial end section, with at least one downstream orifice intended to be in communication with the downstream conduit, the downstream orifice and the upstream orifice being connected by a main channel,
  a shut-off device which is movable between a closed position and an open position with respect to the downstream orifice,
  characterized in that the shut-off device includes a slider which is mounted to slide axially on the downstream axial end section of the valve body, between the closed position in which an axial wall of the slider closes off the downstream orifice and the open position in which the axial wall of the slider clears the passage between the downstream conduit and the downstream orifice, and in that the downstream axial end section of the valve body includes, in the vicinity of the downstream orifice, a recess intended to cause a progressive and controlled expansion during opening of the expansion valve, the downstream orifice extending radially between the main channel and the recess, the downstream axial end section of the valve body including a frustoconical section with an external diameter decreasing from upstream to downstream up to the downstream orifice. The expansion valve according to the invention allows withstanding particularly high pressure differentials without requiring an actuator with a very significant torque. Depending on the configuration of the recess, it is possible to select the degree of progressiveness of the expansion with great fineness, which makes the expansion valve usable for numerous applications.

Another advantage of the expansion valve according to the invention is that it could be reversible and used in both directions of circulation of the fluid.

According to other features of the invention:
  the axial wall of the slider delimits a cylindrical bore, the diameter of which is comprised between the largest diameter and the smallest diameter of the frustoconical portion;
  the downstream axial end of the valve body is provided with a radial sealing element which sealingly cooperates by slipping with the cylindrical bore;
  the sealing element includes a friction ring, for example made of polytetrafluoroethylene, which is pressed against the cylindrical bore by an elastic return element;
  the downstream axial end section of the valve body includes an axial extension and a holding element which is fastened on the axial extension and which axially holds the sealing element on the valve body;
  the elastic return element is constituted by an annular seal made of an elastomer-type material;
  the friction ring includes an internal annular groove wherein a portion of the elastic return element is fitted therein;
  the downstream axial end section of the valve body includes an axial extension and the downstream axial extension of the valve body includes an external annular groove wherein a portion of the elastic return element is fitted therein;
  the valve body includes a surface forming a seat, between the downstream axial end section and the upstream axial end section, an upstream axial end of the slider sealingly bearing axially against the seat in the closed position;
  the slider includes at least one vent which communicates the interior and the exterior of the slider at the downstream end of the expansion valve;
  the vent extends radially into the axial wall of the slider;
  the slider includes an anti-rotation device intended to cooperate with a fixed element during sliding of the slider between its closed position and its open position so as to prevent the rotation of the slider relative to the valve body;
  the valve body includes several downstream orifices distributed circumferentially;
  the valve is of the bidirectional type, the expansion being able to be carried out from the upstream conduit towards the downstream conduit and from the downstream conduit towards the upstream conduit.

The invention also provides a valve assembly including:
  an expansion valve, an actuator capable of controlling the expansion valve in the open or closed position, a mounting body including an upstream conduit and a downstream conduit, and including a housing able to receive the expansion valve, characterized in that the expansion valve is made according to any one of the preceding features, the actuator being connected to the slider in order to control sliding thereof between its open position and its closed position.

According to an advantageous feature of the valve assembly, the internal diameter of the housing is slightly larger than the external diameter of the slider, so as to form a passage for the fluid from the downstream conduit up to the interior of the slider through the vents ensuring a pressure equilibrium between the interior and the exterior of the slider.

BRIEF DESCRIPTION OF THE FIGURES

Further features and advantages of the invention will become apparent from the following detailed description, which may be understood with reference to the attached drawings wherein:

FIG. 2 is an axial sectional view according to the sectional plane 2-2 which represents the valve assembly of FIG. 1 in the closed position;

FIG. 3 is a view similar to that of FIG. 2 which represents the valve assembly of FIG. 1 in the fully open position;

DETAILED DESCRIPTION OF THE INVENTION

Figure 1:
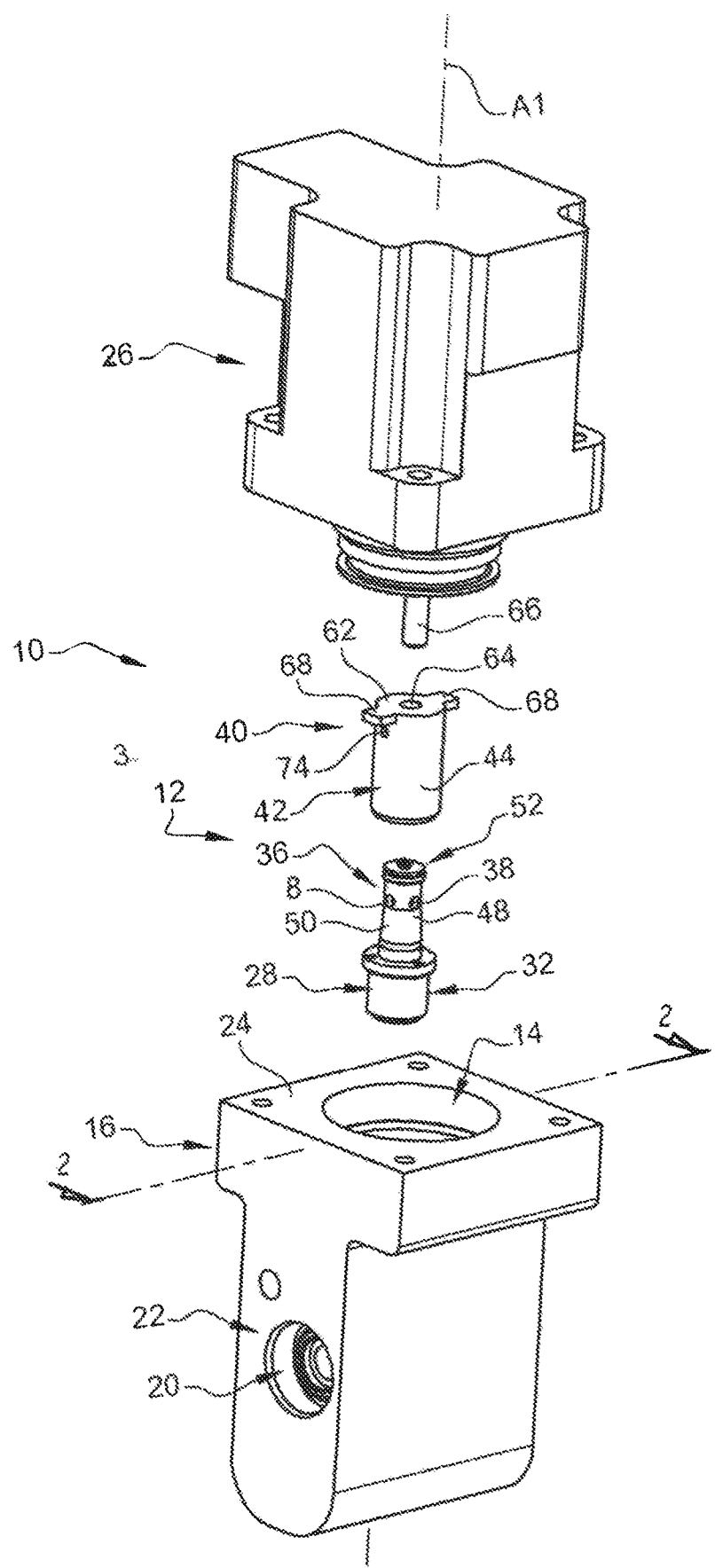
FIG. 1 is an exploded perspective view which schematically represents a valve assembly equipped with an expansion valve according to a first embodiment of the invention.

FIGS. 1 to 3 represent a valve assembly 10 made in accordance with a first embodiment of the invention. The valve assembly 10 includes an expansion valve 12 which is inserted into a housing 14 arranged in a mounting body 16.

The mounting body 16 includes an upstream conduit 18, on the left when considering the figures, and a downstream conduit 20, on the right when considering the figures, each opening into a portion of the housing 14. Thus, the valve assembly 10 includes a fluid passage 22 formed by the upstream conduit 18, the downstream conduit 20, and the expansion valve 12.

The housing 14 herein opens onto an upper face 24 of the mounting body 16 to enable the insertion of the expansion valve 12 into the housing 14. An actuator 26 is herein mounted on the upper face 24 so as to be able to control the expansion valve 12 in the open or closed position.

In the remainder of the description, an orientation from upstream to downstream according to the fluid passage 22 will be used without limitation. Of course, the valve assembly 10 and the expansion valve 12 are intended to operate in both directions, so that the selection of downstream and upstream are arbitrary and are intended only to facilitate the description of the figures.

In a non-limiting manner, an axial orientation from upstream to downstream, according to the main axis A1 of the expansion valve 12, will be used, which corresponds to a vertical orientation from the bottom to the top, when considering FIGS. 1 to 3.

The expansion valve 12 comprises a tubular valve body 28 forming a main channel 30 along the main axis A1. The valve body 28 includes an upstream axial end section 32 which is provided with an upstream orifice 34 in communication with the upstream conduit 18. The upstream axial end section 32 herein forms a substantially cylindrical base which is received in a complementary manner in the bottom of the housing 14 so that the upstream orifice 34 opens into the upstream conduit 18. The upstream orifice 34 herein corresponds to the upstream axial end of the main channel 30.

The valve body 28 includes a downstream axial end section 36 which is provided with at least one downstream orifice 38 intended to be in communication with the downstream conduit 20, when the expansion valve 12 is in the open position, as illustrated in FIG. 3. Advantageously, the downstream axial end section 36 herein includes four downstream orifices 38 which extend radially and which are distributed circumferentially every ninety degrees.

The expansion valve 12 is equipped with a shut-off device 40 which is movable relative to the downstream orifices 38 between a closed position, illustrated in FIG. 2, and an open position, illustrated in FIG. 3.

The shut-off device 40 includes a slider 42 which is mounted to slide axially on the downstream axial end section 36 of the valve body 28, between the closed position in which an axial wall 44 of the slider 42 closes off the downstream orifices 38 and the open position in which the axial wall 44 of the slider 42 clears the passage between the downstream orifices 38 and the downstream conduit 20.

The axial wall 44 of the slider 42 herein has a tubular cylindrical shape with a circular profile and thus delimits an internal cylindrical bore 46.

The downstream axial end section 36 of the valve body 28 includes, in the vicinity of the downstream orifices 38, a recess 48 intended to cause progressive and controlled expansion during opening of the expansion valve 12. In the represented embodiment, the downstream axial end section 36 includes a frustoconical section 50 with an external diameter decreasing from upstream to downstream up to the downstream orifices 38. Thus, the recess 48 is formed in the radial space delimited on one side by the frustoconical section 50 and on the other side by the cylindrical bore 46.

The cylindrical bore 46 herein has a diameter slightly smaller than the largest diameter of the frustoconical section 50 so that, in the closed position, the axial wall 44 of the slider 42 could be in sealed contact with the base of the frustoconical section 50, at the downstream axial end of the slider 42. Hence, there is no fluid passage between the recess 48 and the downstream conduit 20. The fluid originating from the main channel 30 is trapped in the recess by the axial wall 44 of the slider 42 and retained on the upstream side by the contact between the axial wall 44 and the valve body 28, and on the downstream side by a radial sealing element 52.

The sealing element 52 is herein arranged at the downstream axial end of the valve body 28. It allows ensuring a static sealing and a dynamic sealing by slipping against the cylindrical bore 46.

The sealing element 52 herein includes a friction ring 54, preferably made of polytetrafluoroethylene, which is pressed against the cylindrical bore 46 by an elastic return element 56. The elastic return element 56 is herein constituted by an annular seal made of an elastomeric material, or an O-ring gasket.

In particular, the friction ring 54 has the advantage of contributing to the axial sliding guidance by its friction against the slider 42. According to the represented embodiment, the sealing element 52 is held axially on the downstream axial end section 36 by a holding element 58, herein a washer crimped onto an axial extension 60 in the form of a cylindrical pin. The holding element 58 may be crimped thanks to a heading operation applied on the free end of the axial extension 60.

The slider 42 herein includes, at its downstream axial end, a transverse plate 62 provided with a threaded hole 64. The actuator 26 includes an actuation rod 66 herein forming a worm screw intended to cooperate with the threaded hole 64 so as to cause the movement of the slider 42 along the main axis A1.

Thus, when the actuation rod 66 is driven in rotation in the direction of screwing, it causes the axial sliding of the slider 42 from upstream to downstream, between the closed position of FIG. 2 and the open position of FIG. 3. Conversely, when the actuation rod 66 is driven in rotation in the unscrewing direction, it causes the axial sliding of the slider 42 from downstream to upstream.

The transverse plate 62 herein extends by two transverse arms 68 which form an anti-rotation device for the slider 42. These transverse arms 68 are received in complementary slides 70 arranged on the walls of the housing 14, which allows guiding the slider 42 in the top portion 72 of the housing 14 during the rotation of the actuation rod 66.

Of course, other actuation solutions and another anti-rotation device solution could be provided to replace those described herein.

Advantageously, the slider 42 includes at least one vent 74, herein two vents 74, which communicate the interior and the exterior of the slider 42 at the downstream end of the expansion valve 12. The vents 74 herein consist of radial holes in the axial wall 44, just below each transverse arm 68.

Advantageously, the external diameter of the slider 42, at the level of its axial wall 44, is slightly smaller than the corresponding internal diameter of the housing 14 so as to enable a fluid passage from the downstream conduit 20 up to the top portion 72 of the housing 14, and up to the interior of the slider by the vents 74, regardless of the position of the slider 42. This allows ensuring a pressure equilibrium on either side of the transverse plate 62 so that the actuator 26 has not a significant effort to supply during a phase of opening or closing the expansion valve 12 due to the pressure differential between the upstream conduit 18 and the downstream conduit 20.

The operation of the valve assembly 10 according to the first embodiment is now described from the closed position which is illustrated in FIG. 2.

In the represented example, in the closed position, it is considered that the upstream conduit 18 is at a first pressure P1 different from the second pressure P2 in the downstream conduit 20. The valve assembly 10 according to the invention is capable of operating with a very significant pressure differential between the upstream conduit 18 and the downstream conduit 20, for example a pressure differential of 160 bars.

In the closed position, the upstream conduit 18, the main channel 30, and the recess 48 are all at the same pressure, i.e. herein the first pressure P1. The sealed contact between the axial wall 44 and the base of the frustoconical section 50, and the sealed contact between the friction ring 54 and the cylindrical bore 46 prevent the circulation of the fluid between the upstream and the downstream.

The downstream conduit 20, the radial space 76 between the slider 42 and the housing 14, the top portion 72 of the housing 14, the interior of the slider 42, are all at the same pressure, i.e. herein the second pressure P2.

When controlling the progressive opening of the expansion valve 12, the actuator 26 causes sliding of the slider 42 downstream, i.e. upwards, when considering FIGS. 2 and 3. By sliding downstream, the slider 42 progressively uncovers the recess 48 which enables a progressiveness in the expansion of the fluid which begins to progressively pass from the upstream conduit 18 towards the downstream conduit 20, or vice versa depending on the pressure differential.

It should be noted that the progressiveness of the expansion depends on the inclination of the wall of the frustoconical section 50 with respect to the cylindrical bore 46. The lower this inclination, the more progressive the expansion will be. Indeed, the passage section of the fluid between the frustoconical section 50 and the cylindrical bore 46 increases progressively when the slider 42 moves downstream.

The slider 42 continues its travel up to the fully open position which is represented in FIG. 3. Advantageously, in the fully open position, the slider 42 is offset axially downstream with respect to the downstream orifices 38 so as to completely uncover them and thus maximize the passage section of the fluid between the downstream and the upstream.

Of course, the valve assembly 10 operates similarly in the reverse direction, when the slider 42 moves from the open position towards the closed position.

Hence, the expansion valve 12 according to the invention has the advantage of being able to be bidirectional and enabling control of the expansion of the fluid either in the upstream to downstream direction than in the downstream to upstream direction. In a first case, the first pressure P1 is higher than the second pressure P2, in a second case the first pressure P1 is lower than the second pressure P2.

Figure 4:
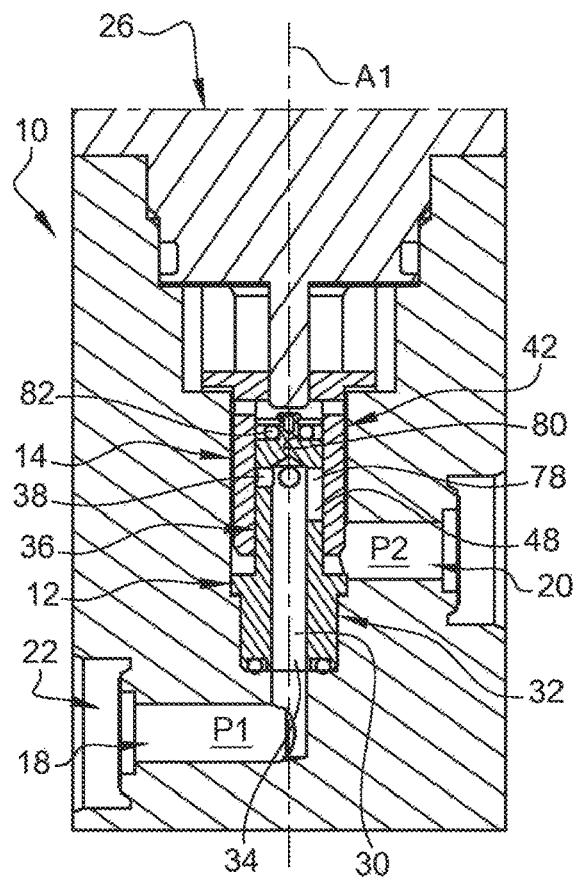
FIG. 4 is a view similar to that of FIG. 2, which represents a second embodiment of the expansion valve in the closed position.
Figure 5:
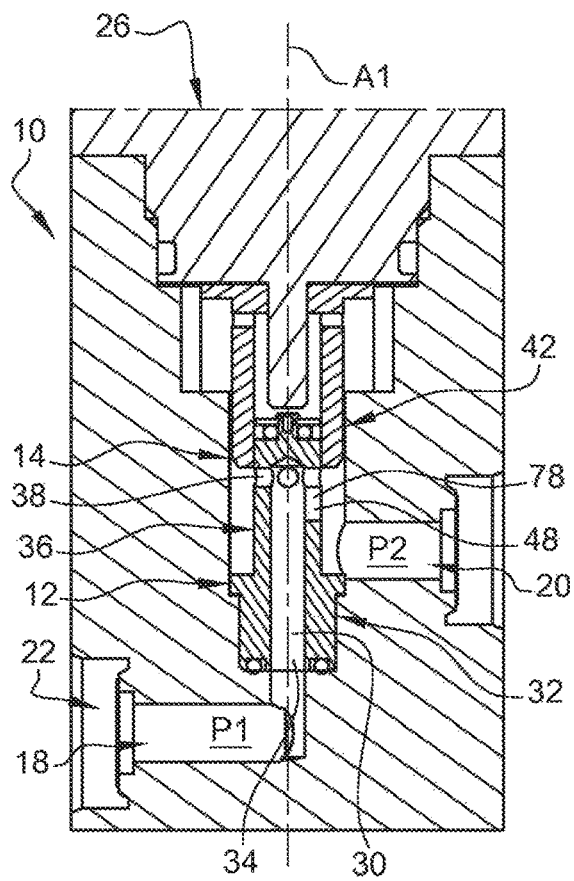
FIG. 5 is a view similar to that of FIG. 4 which represents the second embodiment of the expansion valve in the fully open position.
Figure 6:
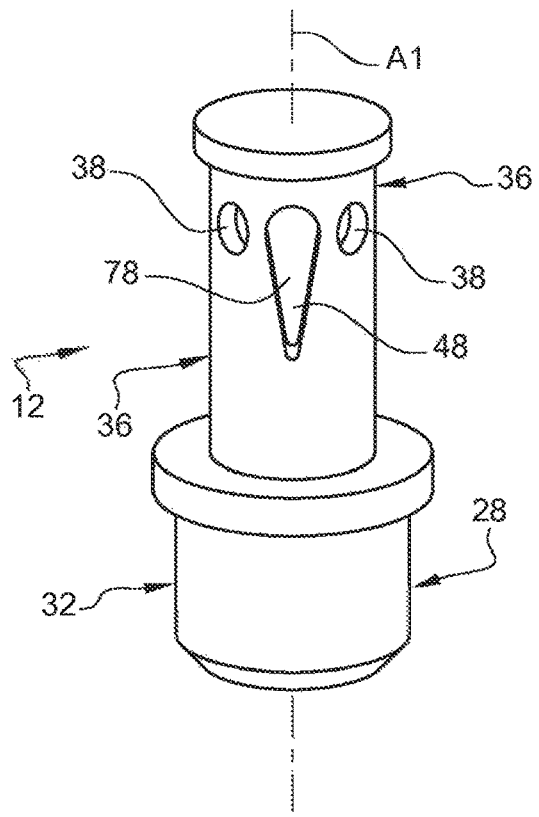
FIG. 6 is a perspective view that schematically represents the valve body and its slot according to the second embodiment.

FIGS. 4 to 6 show a second embodiment of the valve assembly 10 according to the invention. We will now describe only the main elements that differentiate the second embodiment from the first one.

In the second embodiment, the valve body 28 has a cylindrical shape with a circular section and not a frustoconical section, as shown in FIG. 6. The progressiveness of the expansion is obtained by arranging on the external axial wall of the valve body 28 a recess 48 in the form of a slot 78 which progressively widens downstream until reaching the height of the downstream orifices 38. Thus, during an opening phase, the slider 42 first begins by uncovering the bottom of the slot 78, which has a very small passage section, then the top of the slot 78 which has a larger passage section, until all downstream orifices 38 are uncovered, as illustrated in FIG. 5.

The second embodiment also differs by the arrangement of the friction ring 54 and holding thereof on the valve body 28. In this case, the friction ring 54 includes an internal annular groove 80 in which a portion of the elastic return element 56 is housed. The axial extension 60 of the valve body 28 herein includes an external annular groove 82 in which a portion of the elastic return element 56 is housed. The holding element 58 is herein constituted by a nut which is screwed onto the axial extension 60, as a replacement for the crimped washer used in the first embodiment. In this second embodiment, the valve body 28 may include a surface forming a seat on which the slider 42 sealingly bears in its closed position.

The operation of the valve assembly 10 according to the second embodiment is identical to that described for the first embodiment.

LEGEND

- 10: valve assembly
- 12: expansion valve
- 14: housing
- 16: mounting body
- 18: upstream conduit
- 20: downstream conduit
- 22: fluid passage
- 24: upper face
- 26: actuator
- 28: valve body
- 30: main channel
- 32: upstream axial end section
- 34: upstream orifice
- 36: downstream axial end section
- 38: downstream orifice
- 40: shut-off device
- 42: slider
- 44: axial wall
- 46: cylindrical bore
- 48: recess
- 50: frustoconical section
- 52: sealing element
- 54: friction ring
- 56: elastic return element
- 58: holding element
- 60: axial extension
- 62: transverse plate
- 64: threaded hole
- 66: actuation rod
- 68: transverse arm
- 70: slides
- 72: top portion
- 74: vent
- 76: radial space
- 78: slot
- 80: internal annular groove
- 82: external annular groove
- A1: main axis
- P1: first pressure
- P2: second pressure

The invention claimed is:

1. An expansion valve arranged in a fluid passage between an upstream conduit and a downstream conduit, the expansion valve comprising:
   a tubular valve body which is provided, in an upstream axial end section, with at least one upstream orifice in communication with the upstream conduit and, in a downstream axial end section, with at least one downstream orifice in communication with the downstream conduit, the downstream orifice and the upstream orifice being connected by a main channel, a shut-off device which is movable between a closed position and an open position with respect to the downstream orifice, characterized in that the shut-off device includes a slider that is mounted to slide axially on the downstream axial end section of the valve body, between the closed position in which an axial wall of the slider closes off the downstream orifice and the open position in which the axial wall of the slider clears the passage between the downstream conduit and the downstream orifice, and in that the downstream axial end section of the valve body includes, in the vicinity of the downstream orifice, a recess causing progressive and controlled expansion during opening of the expansion valve, the downstream orifice extending radially between the main channel and the recess, the downstream axial end section of the valve body including a frustoconical section with an external diameter decreasing from upstream to downstream up to the downstream orifice.

2. The expansion valve according claim 1, characterized in that the axial wall of the slider delimits a cylindrical bore whose diameter is comprised between the largest diameter and the smallest diameter of the frustoconical section so as to ensure a sealed contact between the axial wall and the frustoconical portion in the closed position.

3. The expansion valve according to claim 2, characterized in that the downstream axial end of the valve body is provided with a radial sealing element which sealingly cooperates by slipping with the cylindrical bore.

4. The expansion valve according to claim 3, characterized in that the sealing element includes a friction ring, made of polytetrafluoroethylene, which is pressed against the cylindrical bore by an elastic return element.

5. The expansion valve according to claim 3, characterized in that the downstream axial end section of the valve body includes an axial extension and a holding element which is fastened on the axial extension and which axially holds the sealing element on the valve body.

6. The expansion valve according to claim 3, characterized in that the elastic return element is constituted by an annular seal made of a elastomer-type material.

7. The expansion valve according to a claim 1, characterized in that the slider includes at least one vent which communicates the interior and the exterior of the slider to the downstream end of the expansion valve.

8. The expansion valve according to claim 7, characterized in that the vent extends radially into the axial wall of the slider.

9. The expansion valve according to claim 1, characterized in that the slider includes an anti-rotation device that cooperates with a fixed element during sliding of the slider between the closed position and the open position so as to prevent the rotation of the slider relative to the valve body.

10. The expansion valve according to claim 1, characterized in that the valve body includes several downstream orifices distributed circumferentially.

11. The expansion valve according to claim 1, characterized in that the expansion valve is of the bidirectional type, the expansion being able to be carried out from the upstream conduit towards the downstream conduit and from the downstream conduit towards the upstream conduit.

12. A valve assembly including:
    the expansion valve of claim 1,
    an actuator able to control the expansion valve in the open or closed position,
    a mounting body including an upstream conduit and a downstream conduit, and including a housing able to receive the expansion valve,
    the actuator being connected to the slider to control sliding thereof between the open position and the closed position.

13. The valve assembly of claim 12, characterized in that the slider includes at least one vent which communicates the interior and the exterior of the slider to the downstream end of the expansion valve, characterized in that the internal diameter of the housing is slightly larger than the external diameter of the slider, so as to form a passage for the fluid from the downstream conduit up to the interior of the slider through the vents ensuring a pressure equilibrium between the interior and the exterior of the slider.

* * * * *